S. CUPLIN.
Bee Hive.
No. 80,395.
2 Sheets—Sheet 1.
Patented July 28, 1868.
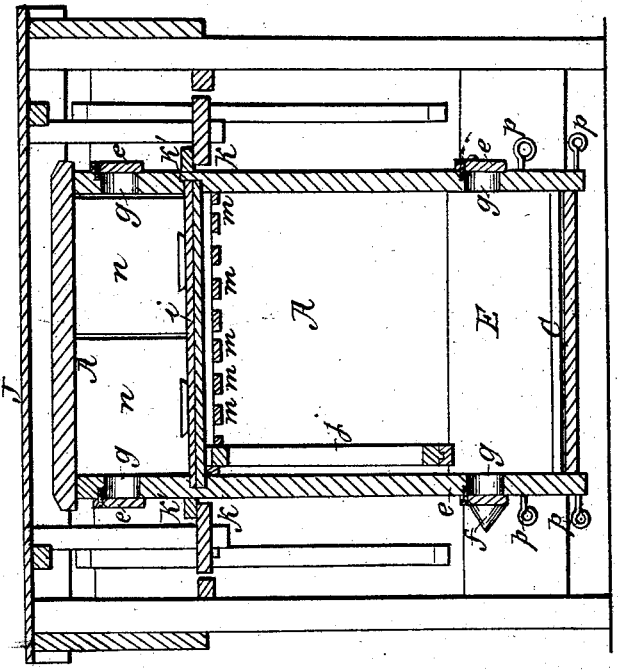
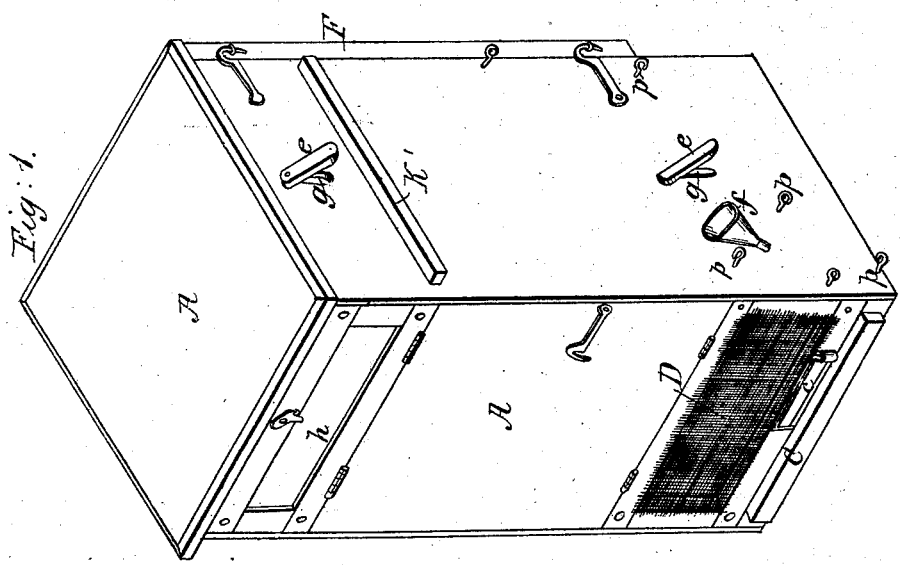

S. CUPLIN.
Bee Hive.
No. 80,395.
2 Sheets—Sheet 2.
Patented July 28, 1868.
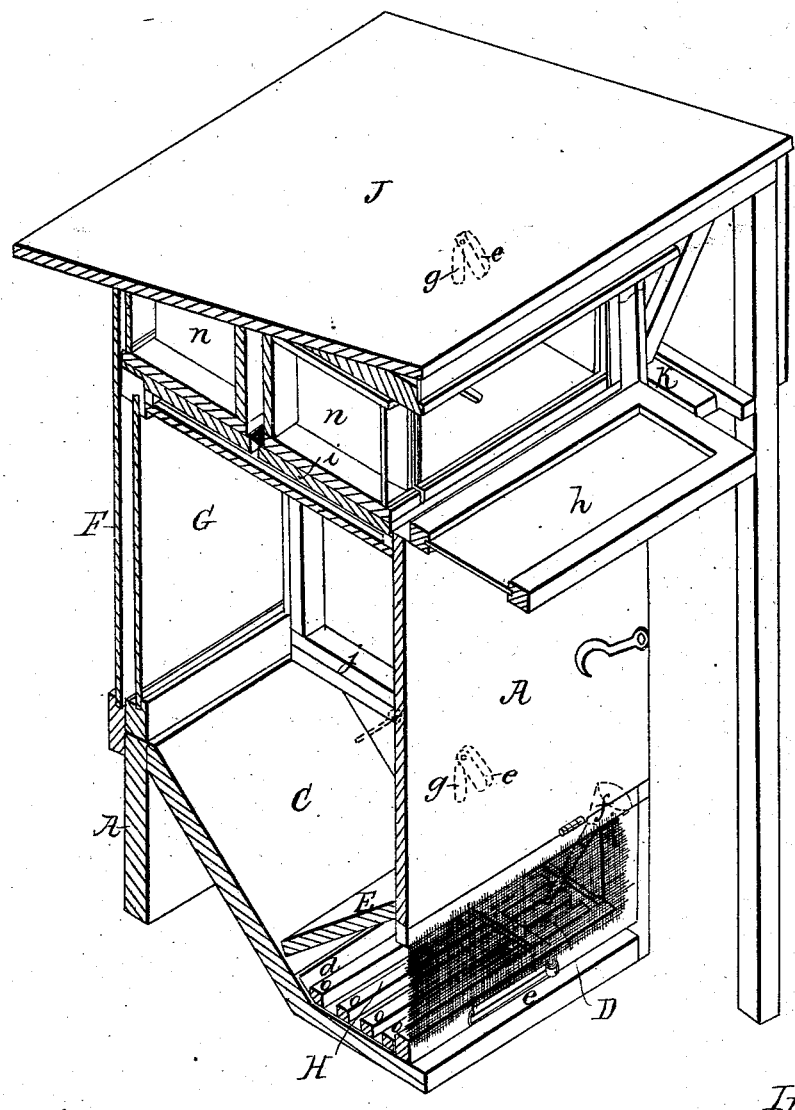

United States Patent Office.

SAMUEL CUPLIN, OF IOWA FALLS, IOWA.

*Letters Patent No. 80,395, dated July 28, 1868.*

IMPROVEMENT IN BEE-HIVES.

*The Schedule referred to in these Letters Patent and making part of the same.*

TO ALL WHOM IT MAY CONCERN:

Be it known that I, SAMUEL CUPLIN, of Iowa Falls, in the county of Hardin, and State of Iowa, have invented certain new and useful Improvements in Bee-Hives; and I do hereby declare that the following is a full, clear, and exact description thereof, reference being had to the accompanying drawings, and to the letters of reference marked thereon, which form a part of this specification, in which—

Figure 1 represents a perspective view of my bee-hive, and

Figure 2 a vertical central section of the same, with the shed attached thereto, in section also.

Figure 3 is a section in perspective.

The object of my invention is to provide a hive which shall be easy of access, afford ample protection and proper ventilation to the bees, and also a ready means of cleansing the hive and feeding the bees; and the nature of it consists in the employment of a wire-gauze shutter or door, hinged to the lower portion of the hive; constructing the hive with an adjustable inclined bottom; providing a feeding-dish or pan, furnished with a float suitably constructed, in combination with a funnel-shaped device; and finally, providing the hive with a shed or protector, substantially in the manner hereinafter set forth.

To enable others to enjoy the benefits of my invention, I will now describe its construction and operation.

In the accompanying drawings, A represents the bee-hive, which is furnished with the adjustable bottom, C, with about two-thirds of its surface inclined, its remaining portion being made horizontal. This bottom is made adjustable or removable, by means of pins or keys, $p\ p$, passing through the sides of the hive, and entering the said bottom. The lower portion, E, of the hive, on its inside, is inclined towards the slanting portion of bottom, C, and having a space between them sufficiently large to allow the bees to pass. The piece E is made adjustable by means of pins or keys $p\ p$ also. $d$ represents the pan or feeding-dish, in which is placed the float H, consisting of the slats $o\ o$; properly connected together. $f$ designates a funnel-shaped device, with its lower extremity entering the feeding-pan, and passing up through the side of the hive, and through which device water may be poured into the pan for the bees. D represents a wire-gauze shutter or door, hinged to the lower part of the hive, and provided at its lower extremity with an aperture or opening, over which slides a shutter, $c$, formed at its outer end with an eye, into which catches or hooks a hook, $c'$, secured to the front part of the hive when it is desired to hold said door up out of the way. $i$ is a slotted partition permanently secured in the upper part of the hive, and provided on its under side with slats, $m$, between which the sliding frame $j$, at its upper end, slides, the lower bar of said frame being provided with a tongue which fits and slides in a grooved rail resting on the bottom, C, and piece E. Any number of these frames may be used in my hive. The partition $i$ is also furnished with holes, the object of which will be seen hereafter. The grooves or spaces between the slats $m\ m$ also afford passage for the bees from the main chamber to the honey-boxes. $n\ n$ designate the honey-boxes, which are made with holes opposite to and similar to those in the partition $i$, on which they rest, and serve as exits for the bees, in order that they may pass through the holes in the partition above referred to, and thus enter the main chamber, or any part of the hive. Instead of one tier of honey, as in the ordinary hive, I have two, access to which may be had by means of the doors $h$ and F, suitably hinged and fastened in place to the hive. $g\ g$ represent ventilating-holes, situated in the upper and lower portions of the sides of the hive. These holes are furnished on their inner surfaces with wire gauze, and covered on their outer surfaces with lids or covers, $e\ e$. G is a glass door, through which access may be had to the main chamber of the hive. J designates a shed or protector, which is provided with pendants secured to its under side, and to said pendants are attached or fastened rests or supports K. Secured to the sides of the hive are strips or projections, K′, which rest on the supports K of the shed J, and by means of which strips, when resting on the supports K, the hive will be elevated a suitable distance above the ground, to protect it from the dampness thereof, or other disadvantages arising therefrom.

What I claim, and desire to secure by Letters Patent, is—

1. Providing the hive with an adjustable inclined bottom, C, when constructed as and for the purpose set forth.

2. The dish or pan $d$, furnished with the float H, in combination with the funnel-shaped device $f$, when arranged in connection with a bee-hive, substantially as and for the purpose set forth.

3. The employment of one or more sliding frames, $j$, constructed substantially as described.

In testimony that I claim the foregoing as my own, I affix my signature in presence of two witnesses.

SAMUEL CUPLIN.

Witnesses:
O. W. GARRISON,
F. H. HART.